(12) United States Patent
Bohaychuk et al.

(10) Patent No.: US 8,490,652 B2
(45) Date of Patent: Jul. 23, 2013

(54) CAGE VALVE WITH FLOW TRIM FOR REDUCED FRACTURING

(75) Inventors: Larry J. Bohaychuk, Ardrossan (CA); Mark K. McNeill, Edmonton (CA)

(73) Assignee: Master Flo Valve Inc., Edmonton (CA)

( * ) Notice: Subject to any disclaimer, the term of this patent is extended or adjusted under 35 U.S.C. 154(b) by 407 days.

(21) Appl. No.: 13/006,237

(22) Filed: Jan. 13, 2011

(65) Prior Publication Data
US 2011/0180167 A1   Jul. 28, 2011

Related U.S. Application Data

(60) Provisional application No. 61/297,652, filed on Jan. 22, 2010.

(51) Int. Cl.
*F16K 3/24* (2006.01)
(52) U.S. Cl.
USPC .............. 137/625.33; 137/375; 137/454.6
(58) Field of Classification Search
USPC ............. 137/375, 454.6, 625.3, 625.33
See application file for complete search history.

(56) References Cited

U.S. PATENT DOCUMENTS

| | | | |
|---|---|---|---|
| 3,937,247 A * | 2/1976 | Van der Wal | 137/375 |
| 4,337,788 A * | 7/1982 | Seger | 137/315.02 |
| 4,503,878 A * | 3/1985 | Taylor | 137/315.02 |
| 4,540,022 A | 9/1985 | Cove | |
| 4,569,370 A | 2/1986 | Witt | |
| 4,638,833 A | 1/1987 | Wolcott, II | |
| 4,705,062 A | 11/1987 | Baker | |
| 4,771,803 A * | 9/1988 | Berchem et al. | 137/375 |
| 4,971,099 A * | 11/1990 | Cyvas | 137/270 |
| 5,074,519 A * | 12/1991 | Pettus | 251/14 |
| 5,086,808 A | 2/1992 | Pettus | |
| 5,246,035 A * | 9/1993 | Skyllingstad et al. | 137/625.31 |
| 5,419,371 A | 5/1995 | Berchem | |
| 5,431,188 A | 7/1995 | Cove | |
| 6,105,614 A | 8/2000 | Bohaychuk et al. | |
| 6,367,546 B1 * | 4/2002 | Mentesh et al. | 166/91.1 |
| 6,446,664 B1 * | 9/2002 | Parsons | 137/375 |

(Continued)

FOREIGN PATENT DOCUMENTS

| | | |
|---|---|---|
| EP | 2042685 | 4/2009 |
| WO | WO 2006/019552 | 1/2006 |
| WO | WO 2008/032101 | 3/2008 |

OTHER PUBLICATIONS

ISR and WO from PCT/CA2011/000027, Apr. 28, 2011.

*Primary Examiner* — John Fox
(74) *Attorney, Agent, or Firm* — Lathrop & Gage LLP (57) ABSTRACT

Cage valve, flow trim components and methods for reduced fracturing of flow trim. The valve is of the type having flow trim arranged across an inlet bore and aligned with an outlet bore, and including a stationary tubular cage and an external cylindrical flow collar slidable along the side wall of the cage to cover or uncover one or more flow ports in the cage side wall. The tubular cage is formed such that, at least in the ported portion in which the flow ports are formed, the cage includes a tubular outer cage member and a tubular inner cage member, the inner cage member and the outer cage member being formed from a tungsten carbide material, being concentrically aligned, having a length to span at least the ported portion, and being joined together by bonding at an interface formed between the inner cage member and the outer cage member.

24 Claims, 4 Drawing Sheets

U.S. PATENT DOCUMENTS

| | | |
|---|---|---|
| 6,634,619 B2 | 10/2003 | Cusac et al. |
| 6,648,070 B2 | 11/2003 | Cove et al. |
| 6,758,530 B2 | 7/2004 | Sollami |
| 6,782,949 B2 | 8/2004 | Cove et al. |
| 6,892,818 B2 | 5/2005 | Mentesh et al. |
| 7,004,448 B2 | 2/2006 | Suter et al. |
| 7,213,609 B2 * | 5/2007 | Mentesh ................ 137/375 |
| 7,255,328 B2 * | 8/2007 | Hunter ................ 251/326 |
| 7,287,739 B2 * | 10/2007 | Arnison et al. ................ 251/14 |
| 7,363,937 B2 * | 4/2008 | Suter et al. ................ 137/375 |
| 7,426,938 B2 | 9/2008 | Bohaychuk et al. |
| 8,051,874 B2 * | 11/2011 | McCarty ................ 137/375 |
| 8,261,767 B1 * | 9/2012 | Blume ................ 137/375 |
| 2010/0051849 A1 | 3/2010 | Bohaychuk |

* cited by examiner

CAGE VALVE WITH FLOW TRIM FOR REDUCED FRACTURING

CROSS REFERENCE TO RELATED APPLICATIONS

This application claims priority from U.S. Provisional Patent Application No. 61/297,652 filed Jan. 22, 2010, which is incorporated by reference in its entirety to the extent that there is no inconsistency with the present disclosure.

BACKGROUND OF THE INVENTION

This invention relates to a cage valve for reduced fracturing, to flow trim components, and to a method of reducing fracturing of the flow trim in the cage valve.

A choke valve is a throttling device commonly used as part of an oil or gas field wellhead. It functions to reduce the pressure of the fluid flowing through the valve. Choke valves are placed on the production "tree" of an oil or gas wellhead assembly to control the flow of produced fluid from a reservoir into the production flow line. They are used on wellheads located on land and offshore, as well as on wellheads located beneath the surface of the ocean. Choke valves common to oil and gas field use are generally described in U.S. Pat. No. 4,540,022, issued Sep. 10, 1985, to Cove and U.S. Pat. No. 5,431,188, issued Jul. 11, 1995 to Cove. Both patents are commonly owned by Master Flo Valve, Inc.

In general, choke valves include:

a valve body having an axial bore, a body inlet (typically oriented as a side outlet to the axial bore) and a body outlet (typically referred to as an end outlet, aligned with the axial bore);

a "flow trim" mounted in the bore between inlet and outlet, for throttling the fluid flow moving through the body; and means such as a stem and bonnet assembly for actuating the flow trim to open and close the choke valve, and for closing the upper end of the axial bore remote from the outlet.

There are four main types of flow trim commonly used in commercial chokes, each of which includes a port defining member forming one or more flow ports, a movable member for throttling the flow ports, and seal means for implementing a total shut off. These four types of flow trim can be characterized as follows:

(1) a needle and seat flow trim comprising a tapered annular seat fixed in the valve body and a movable tapered internal plug for throttling and sealing in conjunction with the seat surface;

(2) a cage with internal plug flow trim, comprising a tubular, cylindrical cage, fixed in the valve body and having ports in its side wall, and a plug movable axially through the bore of the cage to open or close the ports. Shut off is generally accomplished with a taper on the leading edge of the plug, which seats on a taper carried by the cage or body downstream of the ports;

(3) a multiple port disc flow trim, having a fixed ported disc mounted in the valve body and a rotatable ported disc, contiguous therewith, that can be turned to cause the two sets of ports to move into or out of register, for throttling and shut off; and (4) a cage with external sleeve flow trim, comprising a tubular cylindrical cage having ports in its side wall and a hollow cylindrical external sleeve (also termed external flow collar) that slides axially over the cage to open and close the ports. The shut off is accomplished with the leading edge of the sleeve contacting an annular seat carried by the valve body or cage.

In each of the above, the flow trim is positioned within the choke valve at the intersection of the choke valve's inlet and outlet. In most of the valves, the flow trim includes a stationary tubular cylinder referred to as a "cage", positioned transverse to the inlet and having its bore axially aligned with the outlet. The cage has one or more restrictive flow ports extending through its sidewall. Fluid enters the cage from the choke valve inlet, passes through the flow ports and changes direction to leave the cage bore through the valve outlet.

A problem that has produced many production interruptions both with surface and sub-sea facilities is the failure of valve trim due to fracture and cracking. The common causes of this fracture are foreign debris moving through the flow line into the valve with sufficient mass and velocity to damage or fracture the valve trim. High vibration and/or excessive side loads may also result in fracture of the flow trim. Fractures or cracking of the flow trim may be extreme, causing catastrophic failure of the choke valve, which results in over pressurization of the downstream equipment or damage to the well formation due to excessive flow.

Choke valve flow trim is typically manufactured from tungsten carbide material. This material is a powder metallurgy product where tungsten in the concentration of about 85-95% is bonded within a matrix with a binder material, typically nickel, cobalt, molybdenum, chromium or a combination of these elements in the concentration of about 5-15%. This produces a material that is very hard by nature to prevent or delay the effects of erosion to the valve trim. The hardness of the trim components is typically in the Rockwell Ra 90-95 range. As one increases the hardness of the tungsten carbide material (generally by decreasing binder materials in the matrix), the wear values are dramatically improved. However, as the hardness grade of tungsten carbide is increased, the susceptibility to fracture also increases.

There have been a number of attempts at solutions to mitigate the damage caused by foreign debris; however, many of these attempts have resulted in a trade off to the potential wear capabilities of the choke trim. One approach is to manufacture the flow trim from tungsten carbide grades that have a higher percentage of binder material, typically nickel, cobalt, molybdenum, chromium or a combination of these elements. Concentrations in the order of 12-15% have resulted in improved toughness of the tungsten carbide matrix; however, the volume of binder in the concentration results in a matrix with lower hardness and consequently substandard erosion characteristics. This results in rapid wear to the flow trim resulting in costly production interruptions for valve maintenance or in the sub-sea applications, a high valve retrieval cost to facilitate maintenance.

Another approach is to encase the tungsten carbide material with a stainless steel carrier to absorb some of the energy from the foreign particle on impact and to protect the brittle tungsten carbide from direct impact. This approach can be used for the cage with internal plug flow trim. The cage itself is a stainless steel carrier into which an internal tungsten carbide insert is press fit. The plug may also be formed from tungsten carbide. This design works well for the cage/plug flow trim, where the wear is to the internal bore of the cage. However, the internal plug design has proven inferior for erosion resistance when compared to the external sleeve (flow collar) choke valve designs. In the latter type of choke valves, the wear is extreme at the port areas between the external sleeve and the internal cage. For this reason a hard material such as tungsten carbide must be used at the interface between the cage and the external sleeve. Using a steel sleeve over a tungsten carbide insert, as is done with the cage with internal plug design, would result in accelerated erosion. An internal stainless steel sleeve will not only accelerate erosion to the cage bore, but would also result in tension loads being placed on the tungsten carbide outer sleeve. The stress resulting from this arrangement would cause the tungsten carbide component to fracture.

There is still a need for fracture prevention for choke valves of the cage with external sleeve flow trim design. Examples of such choke valves are shown in, for instance, U.S. Pat. No. 4,540,022, issued Sep. 10, 1985, to Cove et al., and U.S. Pat. No. 6,105,614, issued Aug. 22, 2000 to Bohaychuk et al. A choke valve including an external sleeve flow trim in sub-sea applications is shown in U.S. Pat. No. 6,782,949 to Cove et al. These patents describe the beneficial characteristics of the external sleeve (also termed flow collar) design in erosion control, valve outlet erosion protection, seating integrity, and fluid energy control features.

U.S. Pat. No. 7,426,938, issued Sep. 23, 2008 to Bohaychuk et al. relates to a choke valve with external sleeve and cage flow trim designed for fracture prevention. The valve includes a protective tubular sleeve, or insert cartridge in which the side ports are located to overlap with the intersection of axes of the inlet and outlet bores in a manner to avoid direct impingement of fluid along the axis of the inlet bore. In the cage, at least a pair of main flow ports are located to overlap with the intersection of the axes of the inlet and outlet bores, and are aligned with the side ports of the tubular sleeve or cartridge to communicate directly with the side ports. In this manner fluid enters the choke valve through the inlet bore and passes through the main flow ports at reduced pressure and continue out through the outlet bore, without direct impingement on the side wall of the flow trim components.

Figure 1:
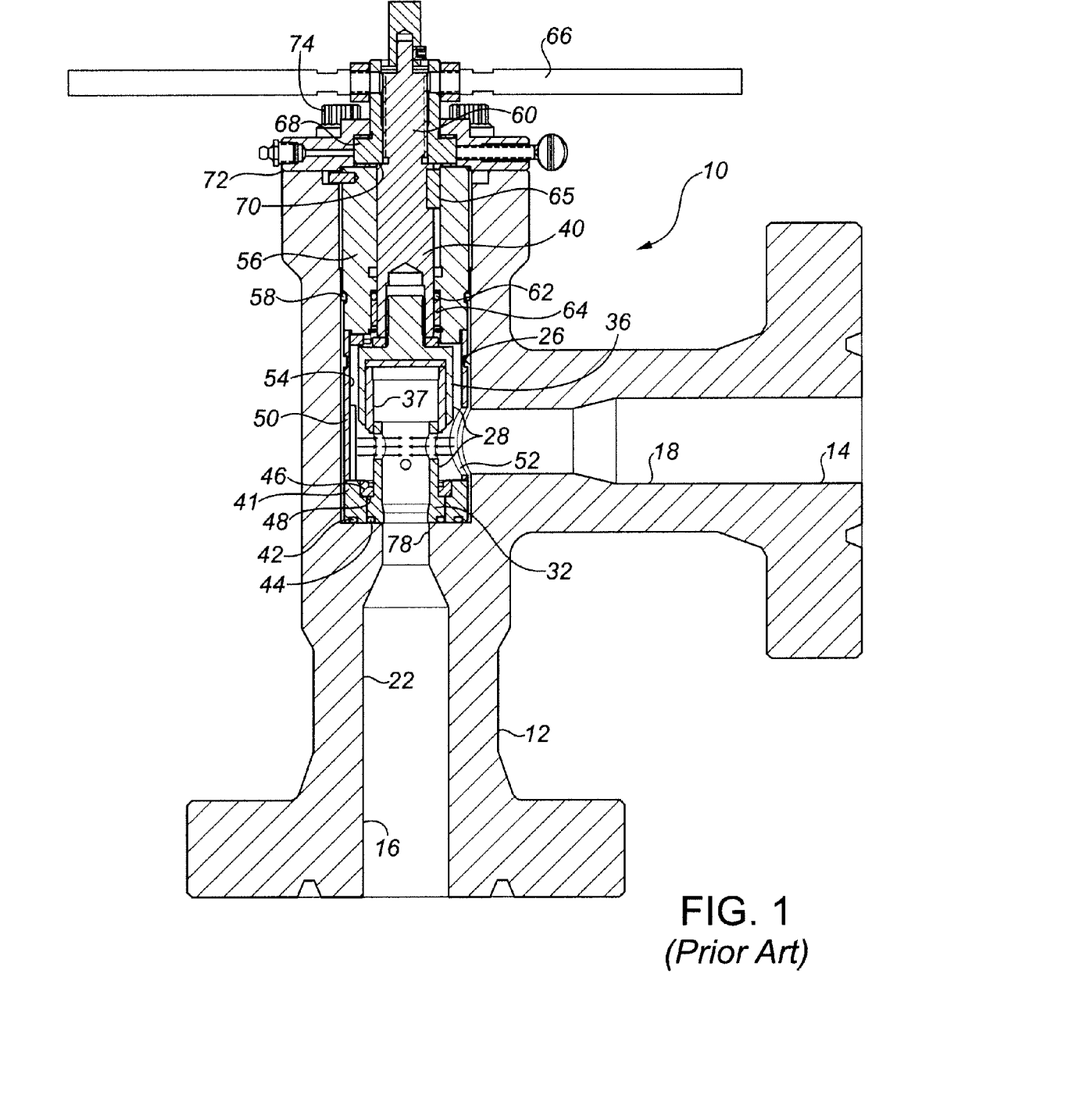
FIG. 1 is a side sectional view of a choke valve of the prior art showing the external flow collar of the flow trim in the fully open position wherein the main flow ports of the inner tubular cage component are fully uncovered.

FIG. 1 shows a typical prior art choke valve in which the flow trim includes an external tubular throttling sleeve (flow collar) that slides over the cage. The sleeve acts to reduce or increase the area of the flow ports. An actuator, such as a threaded stem assembly, is provided to bias the sleeve back and forth along the cage. The rate that fluid passes through the flow trim is dependent on the relative position of the sleeve on the cage and the amount of port area that is revealed by the sleeve.

Figure 2:
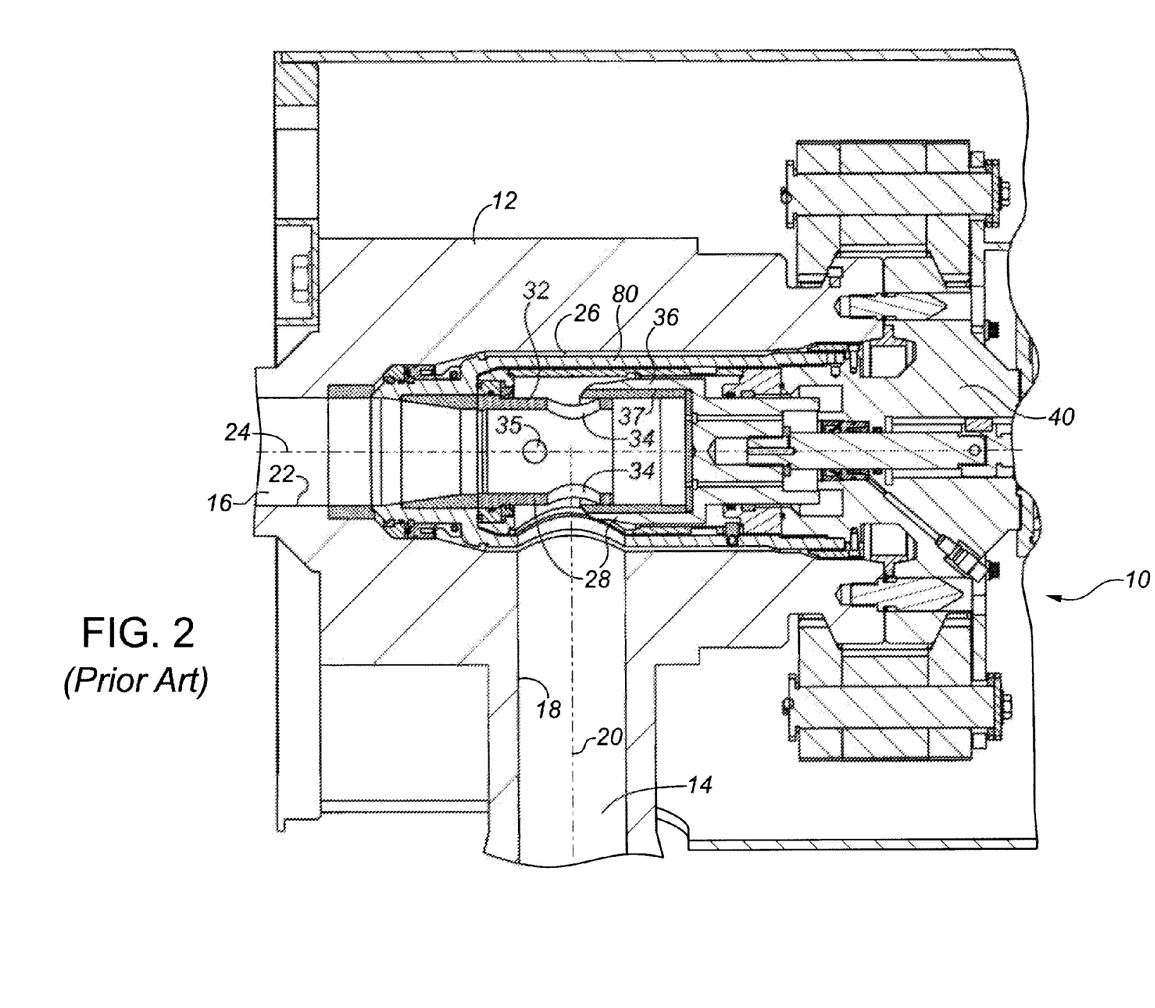
FIG. 2 is a side sectional view of another prior art choke valve, also showing external flow collar/inner cage flow trim, but housed in a removable insert assembly for sub-sea applications.

FIG. 2 shows another prior art choke valve with flow trim of the external sleeve internal cage design, but designed for a sub-sea wellhead. In sub-sea wellheads, maintenance cannot be performed manually. An unmanned, remotely operated vehicle, referred to as an "ROV", is used to approach the wellhead and carry out maintenance functions. To aid in servicing sub-sea choke valves, such choke valves have their internal components, including the flow trim, assembled into a modular sub-assembly. The sub-assembly is referred to as an "insert assembly" and is inserted into the choke valve body and clamped into position.

SUMMARY OF THE INVENTION

In one broad aspect, there is provided a valve having a fluid flow path extending therethrough which is to be restricted or closed. The valve includes a hollow valve body assembly having an inlet bore and an outlet bore substantially at right angles and a main bore which is an extension of the outlet bore and which communicates with the inlet bore. A flow trim is positioned in the main bore, the flow trim including a stationary tubular cage having a side wall, and an external cylindrical flow collar adapted for sliding movement along the side wall of the cage. The side wall of the cage forms an internal bore aligned with the outlet bore and has a ported portion between its ends formed with one or more flow ports. The external flow collar is adapted for movement between a closed position, wherein the one or more flow ports are fully covered by the external flow collar, and an open position, wherein each of the flow ports is fully or partially uncovered by the external flow collar. In this manner, fluid may enter the valve through the inlet bore, pass through the one or more flow ports at reduced pressure and continue through the outlet bore. A bonnet is disengagably connected with, and closes, an upper end of the valve body. A stem biases the external flow collar over the one or more flow ports. In order to reduce fracturing, the tubular cage is formed such that at least the ported portion includes a tubular outer cage member and a tubular inner cage member, the inner cage member and the outer cage member being formed from a tungsten carbide material, being concentrically aligned, having a length to span at least the ported portion, and being joined together by bonding at an interface formed between the inner cage member and the outer cage member. A ductile bonding material may be used at the interface, such as a solder, brazing or cement material. The ductile bonding material acts as a fracture arresting layer at the interface of the inner and outer cage members. In the event of a crack or fracture being initiated in the outer cage member, the ductile bonding material layer prevents the crack from propagating through the inner cage member.

According to another broad aspect, the valve is adapted to have retrievable valve internals for sub-sea applications. As such the valve is preferably arranged as follows:

the inlet bore and the outlet bore are arranged in a T-shape to provide a body side inlet, a body outlet and an insert chamber at the intersection of the body side inlet and the body outlet; and a tubular sleeve and the flow trim are arranged as a removable insert assembly positioned in the insert chamber, the insert assembly comprising:
   (i) a tubular cartridge having a side wall forming an internal bore and at least one side port communicating with the body side inlet, whereby fluid enters through the at least one side port from the body side inlet;
   (ii) the flow trim positioned in the cartridge internal bore, the flow trim comprising the tubular cage aligned with the body outlet, and the external flow collar slidable along the side wall of the cage, the cage side wall forming one or more pairs of diametrically opposed flow ports located to overlap the intersection of the axes of the body side inlet and the body outlet, and aligned with the at least one side port of the tubular cartridge to communicate with the side port, whereby fluid from the body side inlet may enter the cage bore at reduced pressure and pass through the body outlet;
   (iii) the bonnet disengagably connected with, and closing, the upper end of the tubular cartridge and the body; and
   (iv) the stem for biasing the flow collar over the main flow ports.

Also provided are components of the valve, including the flow trim components and the retrievable valve components adapted as a removable insert assembly for sub-sea applications. There is also provided a method of reducing fracturing of the flow trim of a valve of a cage with external sleeve flow trim design.

DETAILED DESCRIPTION OF THE INVENTION

As used herein and in the claims, the word "comprising" is used in its non limiting sense to mean that items following the word in the sentence are included and that items not specifically mentioned are not excluded. The use of the indefinite article "a" in the claims before an element means that one of the elements is specified, but does not specifically exclude others of the elements being present, unless the context clearly requires that there be one and only one of the elements.

The flow trim and cage component may be used in any external sleeve (flow collar) and inner cage valve design, and not merely in the valves of the type illustrated in FIGS. 1 and 2. For example, the cage component may be adapted for use with other known external sleeve inner cage valves, for example cage valves in which the cage component is fitted at or into the outlet of the valve, for example by threading. The cage component may be adapted for use in external sleeve inner cage valves in which the cage component is multi-ported, with a plurality of flow ports (same or differently sized) arranged circumferentially around the ported portion of the cage component. In the description which follows, the cage component is described as being adapted for flow trim of the type shown in FIGS. 1 and 2, however, this description is illustrative only, and the claims which follow should not be interpreted as being limited to these valves.

Each of FIGS. 1 and 2 show a choke valve which is of a external sleeve inner cage valve type. The valve is generally shown at 10, and includes a hollow valve body 12, a body side inlet 14 and a body outlet 16. The hollow valve body 12 forms a bore which extends therethrough providing side inlet bore 18 having an inlet bore axis 20 (see FIG. 2, centre axis), a bottom outlet bore 22 having outlet bore axis 24 (see FIG. 2, centre axis). The side inlet bore 18 and the bottom outlet bore 22 intersect at right angles (i.e., are generally T-shaped), forming a main bore 26 at the intersection. The main bore 26 is an extension of the bottom outlet bore 22, but also communicates with the side inlet bore 18. FIG. 2 shows a somewhat similar valve designed for sub-sea applications, with a removable insert assembly for remote controlled maintenance. While the above main valve parts are common to both valves in FIGS. 1 and 2, the description below is adapted to describe the valve of FIG. 1 in greater detail.

Flow trim components 28 are shown to be located in the main bore 26, including a stationary cage component 32 (herein termed cage) which is tubular and substantially open-ended, and an external throttling cylindrical sleeve (herein also termed flow collar) 36 adapted to slide along the outer side wall of the upstream end of the cage 32. The flow collar 36 is closed at its upper end (upstream end) and typically includes a steel exterior into which is press fit an inner liner 37 formed of hard, erosion resistant material, such as tungsten carbide. The cage 32 has a side wall which forms an internal bore that communicates with, and is substantially aligned with, the outlet bore 22. The side wall of the cage 32 also forms one or more flow ports, shown as being arranged as at least a pair of diametrically opposed main flow ports 34. Alternatively, as noted above, a plurality of circumferentially spaced flow ports may be present. The cage side wall may also be formed with at least a pair of diametrically opposed smaller, secondary flow ports 35. The secondary flow ports 35 have a smaller diameter than that of the main flow ports 34, and are positioned with their axis (i.e., an axis through the midpoint of the ports) rotated or offset by 90° from the axis of the main flow ports 34. The secondary ports 35 are positioned closer to the body outlet 16 than are the main flow ports 34. The main flow ports 34, being larger in diameter, collectively accommodate a majority (i.e., more than 50%) of the fluid flow from the inlet 14. Preferably, the main flow ports 34 are arranged as diametrically opposed pairs, such as 1, 2 or 3 pairs. The main flow ports 34 may be circumferentially spaced and circumferentially aligned on the cage 32 (i.e., the midpoints of the ports 34 are equally spaced in a circle around the circumference of the cage 32). As well, the main flow ports may be located to overlap the intersection of the centre axes of the body side inlet 14 and the body outlet 16. As well, at least one pair of the one or more pairs of the diametrically opposed main flow ports may be arranged such that a line through a midpoint of the diametrically opposed main flow ports is parallel to a centre axis of the inlet bore.

The flow collar 36 is connected to a stem/bonnet assembly 40 for closing the upper end of the valve body 12 (i.e., the end opposite the outlet 16) and for advancing or withdrawing the flow collar 36 to slide across the ports 34, 35 to close them or open them as described below. The flow trim components 28 are preferably made of an erosion resistant hard material such as tungsten carbide. The tubular cage 32 is designed as described in greater detail below. In FIGS. 1 and 2, the cage 32 is shown as known in the prior art, for example a unitary item formed from tungsten carbide material.

The main bore 26 is formed to be larger in diameter than the outlet bore 22 in order to house, seat and seal the flow trim components 28 therein. A cylindrical seat 41 is positioned at the lower end of the main bore 26, and sealed to the valve body 12 in the main bore 26 with seat seal 42. The stationary cage 32 is held at its lower end within the inner diameter of the seat 41, and carries a cage seal 44 at its lower end to seal to the valve body 12. A seat insert member 46 is seated in the inside diameter of seat 41. This seat insert member 46 is preferably formed of erosion resistant material such as tungsten carbide and serves multiple purposes. The seat insert member 46 protrudes inwardly to the cage 32 above a widened retaining shoulder 48 of the cage 32, thereby retaining the cage 32 within the main bore 26. As well, the seat insert member 46 forms a seat for the flow collar 36, when the flow collar 36 is in the fully closed position covering the main and secondary flow ports 34, 35. A tubular retaining sleeve 50 is preferably positioned in the main bore 26 between the seat 41 and the bonnet 56. The flow trim 28 is positioned within the retaining sleeve 50. The retaining sleeve 50 extends transversely over the inlet bore 18, and has its bore 54 aligned with the outlet axis 24. The sleeve 50 includes at least one sleeve side port 52 into the sleeve bore 54, the side port 52 preferably being aligned with the inlet bore. In alternate embodiments, the sleeve side port 52 and main flow ports 34 may be offset relative to the inlet bore 18 for fracture prevention from debris moving down the inlet, as is described in U.S. Pat. No. 7,426,938 to Bohaychuk et al. In still further embodiments, the tubular retaining sleeve 50 may be omitted and the cage component may be held at or within the outlet bore 22, for example by threading.

The stem/bonnet assembly 40 is shown to include a stationary bonnet member 56 extending into the main bore 26, and carrying bonnet-body seal 58. Housed within the bonnet member 56 is threaded stem member 60. The stem 60 and bonnet 56 are sealed through stem-bonnet seal 62 and stem bushing 64. The stem 60 is designed for axial movement, the result of rotational movement of the upper stem nut 68 on the threaded section of the stem 60, initiated for example by rotating the handle 66 at its upper end. The stem 60 is connected and sealed to the flow collar 36 at its lower end in a known manner to impart translational movement to the flow collar 36 for opening and closing the valve 10. Key member 65, positioned between the stem 60 and the bonnet 56, prevents rotational movement of stem 60 within the bonnet 56, while permitting translational movement to be imparted to the flow collar 36. The upward movement of the stem 60, and thus the flow collar 36, is limited when stem shoulder 70 hits the stem nut 68. Alternate stem stop mechanisms may be used to limit upward stem movement to prevent fully uncovering the main flow ports 34, as described in U.S. Patent Application published as U.S. Publication No. 2010/0051849 A1, to Bohaychuk. The bonnet 56 is connected at its upper end to bonnet flange 72, which retains the bonnet 56 and closes the upper end of the main bore 26. The flange 72 is bolted to the valve body 12 through cap screws 74. Alternate mechanisms for closing the valve body 12, and for actuating the flow collar 36 for translational movement are well known in the art, such as hydraulic actuators.

The choke valve 10 may also include inwardly extending protuberances to deflect flow toward the main flow ports 34 of the cage 32, as described in U.S. Pat. No. 7,426,938 and U.S. Pat. No. 6,105,614, both to Bohaychuk et al.

As shown in FIG. 2, the flow trim and stem/bonnet assembly may be positioned as an insert assembly wherein the flow trim 28 is held within a removable tubular cartridge 80 (in place of tubular retaining sleeve 50) in the main bore for sub-sea applications, such as shown in prior art including U.S. Pat. No. 7,426,938 to Bohaychuk et al. or U.S. Pat. No. 4,540,022 to Cove. The flow trim cage component, denoted as 32 in FIGS. 1 and 2, is designed as described in more detail below.

Figures 3, 4, 5:
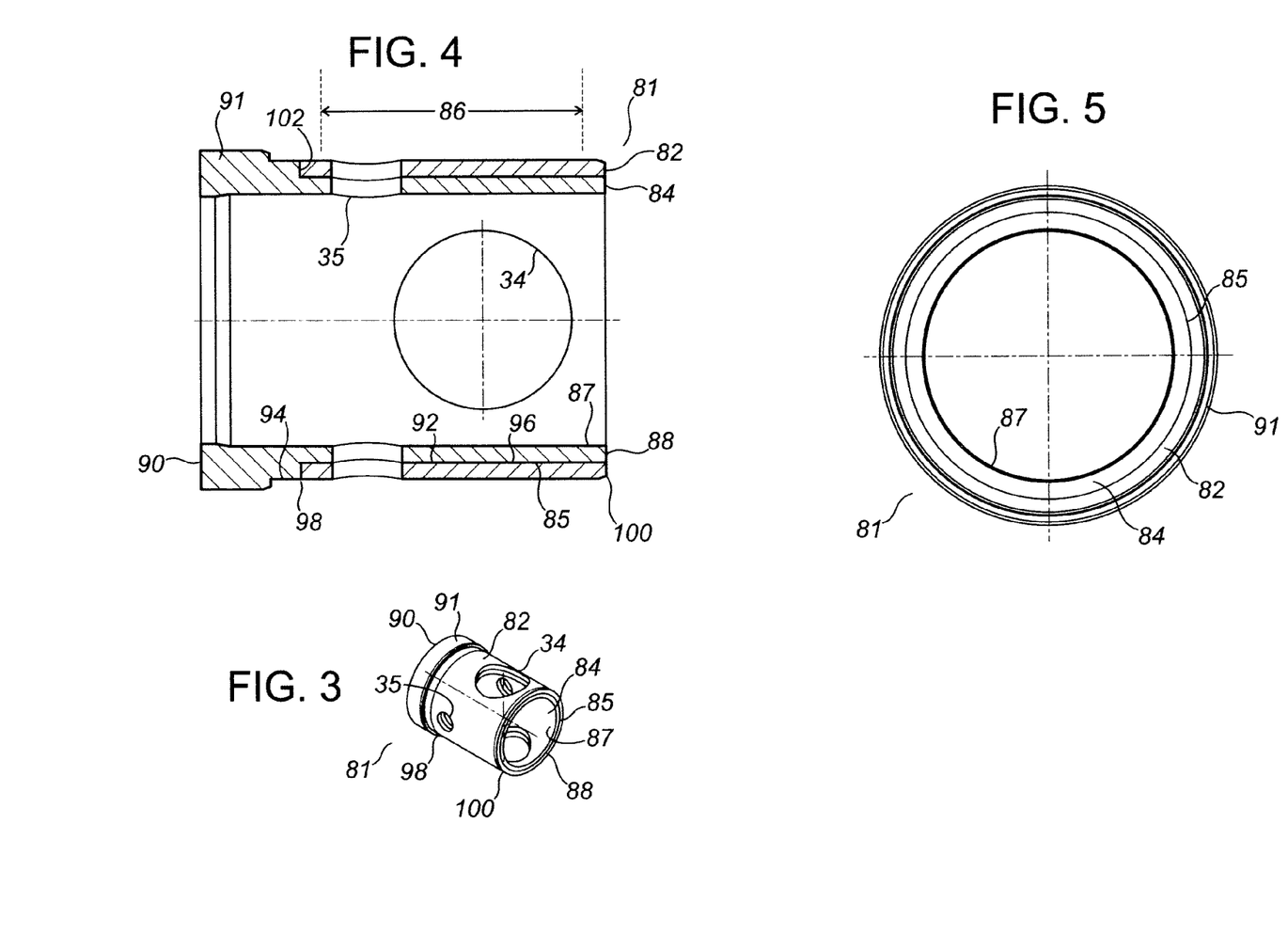
FIG. 3 is a perspective view of the tubular cage component of the flow trim adapted for either type of flow trim (i.e., flow trim of FIG. 1 or FIG. 2), formed with an outer tungsten carbide cage member seated and carried on the outer wall of an inner tungsten carbide cage member. Each of the outer and inner cage members are formed with a pair of diametrically opposed main flow ports and a pair of diametrically opposed secondary flow ports so as to form aligned flow ports through the cage members when the cage members are assembled.
FIG. 4 is a side sectional view of the cage component of FIG. 3, taken through the secondary ports of FIG. 3, showing the inner and outer cage members concentrically joined over the ported portion of the tubular cage.
FIG. 5 is an end view of the cage component of FIG. 3.
Figure 6:
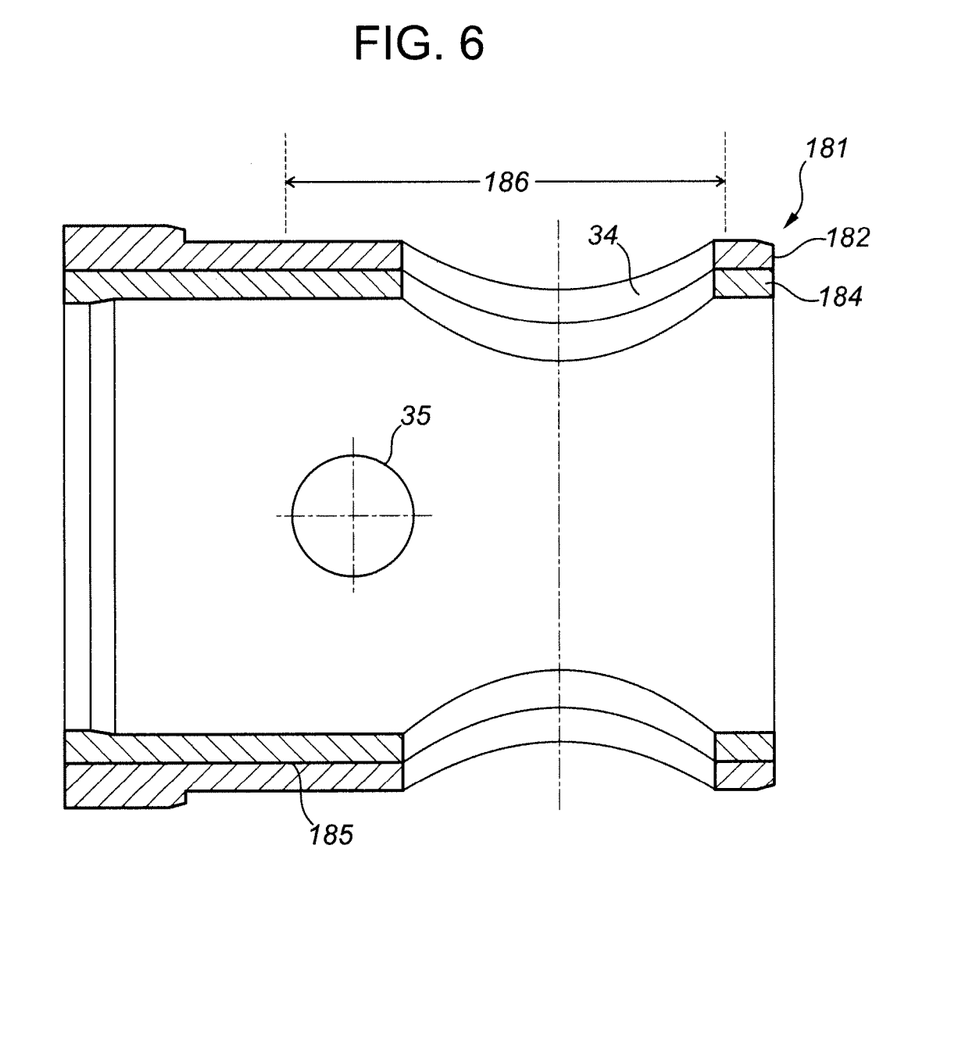
FIG. 6 is a side sectional view of another embodiment of a tubular cage component of the flow trim, taken through the diametrically opposed main flow ports. This embodiment is adapted for use in either type of flow trim (FIG. 1 or FIG. 2) and shows the inner tungsten carbide cage member extending along the full length of (i.e., is co-extensive with) the outer tungsten carbide cage member.

In FIGS. 3-6, the tubular cage component (for use in place of cage component 32 in either of the valves of FIG. 1 or 2) is shown generally as cage 81. The cage 81 is formed to include a tubular outer cage member 82 and a tubular inner cage member 84. The interface 85 between the cage members 82, 84 is bonded such that the cage members are joined concentrically along their lengths. In FIG. 3, the outer surface of the inner cage member 84 is joined by bonding to the inner surface of the outer cage member 82. The members 82, 84 may extend concentrically along the entire length of the cage as shown in FIG. 6, in which the members 82, 84 are co-extensive with each other. Alternatively, the cage members 82, 84 may be arranged such that one cage member is seated with the other cage member, with one such seated arrangement being shown in FIG. 3. In either arrangement (co-extensive or seated), the cage members 82, 84 extend at least along the tubular ported portion 86 of the tubular cage 81, that is the tubular portion of the cage 81 in which the one or more flow ports are located, for example the one or more main flow ports 34, and the secondary flow ports 35 if included. This ported portion 86 experiences rapid wear during use, and is prone to fracture as described above.

The outer and inner cage members 82, 84 may be formed as close fitting sleeves or inserts, allowing one to slide over the other in close tolerance at the interface 85 between the cage members 82, 84, but leaving a clearance at the interface 85 between the members 82, 84. For example, a clearance gap of between about 0.005 and 0.020 inches, being the difference in the outside diameter (OD) of the inner cage member 84 and the inner diameter (ID) of the outer cage member 82, may be maintained. Once assembled, the cage members 82, 84 are joined together by bonding, concentrically along their lengths, by such bonding techniques as soldering, brazing or cementing, with the clearance gap at the interface 85 being filled with a ductile bonding material (ex. a solder, braze, cement, or epoxy material), which is softer than the harder grade tungsten carbide material of the cage members 82, 84. In the finished state, this ductile bonding material acts as a fracture arresting layer at the interface 85 of the inner and outer cage members 84, 82. In the event of a crack or fracture being initiated in the outer cage member 82, the ductile bonding material layer prevents the crack from propagating through the inner cage member 84.

It should be understood that the tubular cage 81 may be formed with additional sleeve members, coatings or inserts between the outer and inner cage members 82, 84, in which case, when the outer and inner cage members are concentrically joined together by bonding along their lengths, such additional sleeve members, coatings or inserts are sandwiched in between.

Both of the outer and inner cage members 82, 84 are formed from hard, wear resistant materials such as tungsten carbide materials or other hard, wear resistant ceramics. By forming the cage members 82, 84 separately, and then concentrically joining them together by bonding, it is possible to form the two cage members from different hardness materials and/or with different thicknesses. One exemplary embodiment includes forming the outer cage member 82 from a hard tungsten carbide grade, for example an Ra 92 or greater tungsten carbide, such as an Ra 93-94 tungsten carbide, and forming the inner tungsten carbide from a more ductile grade, for example an Ra 90 or less tungsten carbide, such as an Ra 88-90 tungsten carbide. In this exemplary embodiment, the outer cage member of the harder grade tungsten carbide is more brittle, but any cracking that occurs in the outer cage member 82, for example from a debris strike, may propagate inwardly through the side wall of outer cage member 82, but is interrupted at the interface 85 between the cage members 82, 84 (which is filled with the ductile bonding material such as solder or braze, and/or may include additional sleeve members, coatings or inserts). This interface 85, which is generally cylindrical in shape, limits the ability of the crack to propagate through the side wall of the inner cage member 84. This greatly reduces catastrophic failure of the flow trim due to fracturing. As well, the inner cage member 84, when formed of a more ductile grade tungsten carbide, is more resistant to cracking.

In order to fabricate the tubular cage 81 of FIG. 3, the inner tubular cage 84 is formed in the green state from a tungsten carbide matrix, and is machined or molded to include an internal bore 87 between its respective end portions 88, 90 (end portion 90 being the outlet end to be most proximate the outlet bore 22, and thus may be formed with an outwardly extending hub 91 for retention and sealing in the main bore 26). Other cage retaining arrangements may be used, as known in the art. A cylindrical cut-out section 92 (see FIG. 4) is machined from the outside diameter of the side wall 94 to accept the outer cage member 82 as a concentric, sliding sleeve. The outer tubular cage 82 is formed in the green state of tungsten carbide to include an inner bore 96 which is slightly larger than the OD of the cut-out section 92, and has a length between its end portions 98, 100 to fit into the cut-out section 92. The cut-out section 92 is formed with a stop shoulder 102, against which the end 98 of the outer cage member 82 may seat. Main and secondary ports 34, 35 are machined through the respective side walls of the outer and inner cage members 82, 84 in a manner such that the ports of each cage member 82, 84 are aligned once concentrically joined. The machined green parts for cage members 82, 84 thus formed may then be sintered at high temperatures to densify the parts. Grinding may then be performed to achieve final tolerances of the surfaces, as needed. In particular, the fit at the interface 85 between the two cage members 82, 84 is ground (machined) at their adjoining surfaces after sintering to maintain the required geometric tolerances for concentric joining together with a bonding material, and fitting within the main bore 26 of the valve body 12. The outer cage member 82 may then be concentrically joined over the cut-out section 92 by soldering, brazing or cementing, for example using a silver brazing or soldering alloy material, at high temperatures. The joined cage members 82, 84 may then be cooled and further ground or polished as needed for final tolerance fitting with the external flow collar 36 and main bore 26.

During the bonding process, the braze or solder material may be gravity fed into or placed within the interface 85 between the outer and inner cage members 82, 84. Alternatively, depending on tolerances, a cement such as epoxy may be applied at the interface 85 before assembly. To assist in filling the interface 85 between the cage members 82, 84, the inner and outer cage members 84, 82 may be heated and vibrated. For brazing or soldering, the assembled inner and outer cage members 84, 82 may be bonded while on end to use gravity to draw the braze or solder material to fill the cylindrical interface 85 and seat area to fully bond the cage members 84, 82. After the cage members 84, 82 cool, the cage 81 is firmly retained, with the braze, solder or cement providing a ductile bonding material at the cylindrical interface 85 between the cage members 84, 82 extending concentrically along their lengths. Exemplary braze or solder materials for tungsten carbide materials are silver and silver/copper alloys.

In another embodiment, the tubular cage members 82, 84 may be alternatively seated compared to FIG. 3, such that the inner cage member 82 is seated as an insert within the outer cage member. In this embodiment, an internal bore of the outer cage member may be formed with a counterbore cut-out section and a stop shoulder to accept the inner cage member as an insert over at least the ported portion. When concentrically joined, the inner and outer cage members may form a constant diameter internal bore aligned with the outlet. The outer cage member might be formed from a harder grade tungsten carbide, while the inner cage member might be formed from a more ductile grade tungsten carbide. Similar fabrication techniques apply to this embodiment.

In the embodiment shown in FIG. 6, the tubular cage component 181 is formed with an inner cage member 184 and an outer cage member 182 which are co-extensive one with another, along their entire lengths, not only in the ported portion 186. The inner and outer cage members 184, 182 are similarly joined along the lengths at their interface 185 by bonding, for example by brazing or soldering, as described above.

While the tubular cage 81, 181 is shown in the Figures as having a generally constant diameter internal bore, it should be understood that the internal bore might be tapered or alternatively shaped in some applications.

All references mentioned in this specification are indicative of the level of skill in the art of this invention. All references are herein incorporated by reference in their entirety to the same extent as if each reference was specifically and individually indicated to be incorporated by reference. However, if any inconsistency arises between a cited reference and the present disclosure, the present disclosure takes precedence. Some references provided herein are incorporated by reference herein to provide details concerning the state of the art prior to the filing of this application, other references may be cited to provide additional or alternative device elements, additional or alternative materials, additional or alternative methods of analysis or application of the invention.

The terms and expressions used are, unless otherwise defined herein, used as terms of description and not limitation. There is no intention, in using such terms and expressions, of excluding equivalents of the features illustrated and described, it being recognized that the scope of the invention is defined and limited only by the claims which follow. Although the description herein contains many specifics, these should not be construed as limiting the scope of the invention, but as merely providing illustrations of some of the embodiments of the invention.

One of ordinary skill in the art will appreciate that elements and materials other than those specifically exemplified can be employed in the practice of the invention without resort to undue experimentation. All art-known functional equivalents, of any such elements and materials are intended to be included in this invention. The invention illustratively described herein suitably may be practiced in the absence of any element or elements, limitation or limitations which is not specifically disclosed herein.

The invention claimed is:

1. A valve having a fluid flow path extending therethrough which is to be restricted or closed, comprising:
   a hollow valve body assembly having an inlet bore and an outlet bore substantially at right angles and a main bore which is an extension of the outlet bore and which communicates with the inlet bore;
   a flow trim positioned in the main bore, the flow trim comprising a stationary tubular cage having a side wall, and an external cylindrical flow collar adapted for sliding movement along the side wall of the cage, the side wall of the cage forming an internal bore aligned with the outlet bore and having a ported portion between its ends formed with one or more flow ports, the external flow collar being adapted for movement between a closed position, wherein the one or more flow ports are fully covered by the external flow collar, and an open position, wherein each of the flow ports is fully or partially uncovered by the external flow collar, whereby fluid may enter the valve through the inlet bore, pass through the one or more flow ports at reduced pressure and continue through the outlet bore;
   a bonnet disengagably connected with, and closing, an upper end of the valve body;
   a stem for biasing the external flow collar over the one or more flow ports; and the tubular cage being formed such that at least the ported portion includes a tubular outer cage member and a tubular inner cage member, the inner cage member and the outer cage member being formed from a tungsten carbide material, being concentrically aligned, having a length to span at least the ported portion, and being joined together by bonding at an interface formed between the inner cage member and the outer cage member.

2. The valve of claim 1, wherein the interface is filled with a ductile bonding material.

3. The valve of claim 2, which further comprises one or more sleeve members, coatings or inserts in the interface between the inner and outer cage members.

4. The valve of claim 2, wherein the ductile bonding material is a solder, brazing or cement material.

5. The valve of claim 2, wherein the ductile bonding material is a solder or brazing material.

6. The valve of claim 5, wherein the inner cage member and the outer cage member are formed from different grade tungsten carbide materials.

7. The valve of claim 5, wherein the inner cage member and the outer cage member are formed with different thicknesses.

8. The valve of claim 5, wherein one of the inner cage member and the outer cage member is formed from a tungsten carbide material having a hardness between about 92 and 94 Ra and the other of the inner cage member and the outer cage member is formed from a tungsten carbide material having a hardness less than 90 Ra.

9. The valve of claim 5, wherein the outer cage member is formed from a tungsten carbide material having a hardness between about 93 and 94 Ra, and the inner cage member is formed from a tungsten carbide material having a hardness between about 88 and 90 Ra.

10. The valve of claim 5, wherein one of the inner cage member or the outer cage members is seated with the other of the cage members.

11. The valve of claim 5, wherein the inner cage member and the outer cage member are coextensive along their entire lengths.

12. The valve of claim 5, wherein the one or more flow ports are arranged to include one or more pairs of diametrically opposed main flow ports.

13. The valve of claim 12, wherein there is one pair of diametrically opposed main flow ports.

14. The valve of claim 12, which further comprises a tubular sleeve positioned in the main bore across the inlet bore and forming at least one side port communicating with the inlet bore, the flow trim being positioned within the tubular sleeve, and wherein the bonnet closes the upper end of both the valve body and the tubular sleeve.

15. The valve of claim 14, wherein the at least one side port is aligned with the inlet bore, and one pair of the one or more pairs of the diametrically opposed main flow ports is arranged such that a line through a midpoint of the diametrically opposed main flow ports is parallel to a centre axis of the inlet bore.

16. The valve of claim 15, further comprising:
at least a pair of diametrically opposed secondary flow ports formed in the side wall of the cage, the secondary flow ports having a smaller diameter than a diameter of the main flow ports and each pair of secondary flow ports being positioned with an axis which is offset by 90° from the axis of one of the pairs of main flow ports and closer to the body outlet than are the main flow ports.

17. The valve of claim 14, wherein:
the inlet bore and the outlet bore are arranged in a T-shape to provide a body side inlet, a body outlet and an insert chamber at the intersection of the body side inlet and the body outlet; and
the tubular sleeve and the flow trim are arranged as a removable insert assembly positioned in the insert chamber, the insert assembly comprising:
(i) the tubular sleeve being adapted as a tubular cartridge having a side wall forming an internal bore and the at least one side port communicating with the body side inlet, whereby fluid may enter through the at least one side port from the body side inlet;
(ii) the flow trim being positioned in the cartridge internal bore, the flow trim comprising the tubular cage aligned with the body outlet, and the external flow collar slidable along the side wall of the cage, the cage side wall forming the one or more pairs of diametrically opposed main flow ports located to overlap the intersection of the axes of the body side inlet and the body outlet, and aligned with the at least one side port of the tubular cartridge to communicate with the side port, whereby fluid from the body side inlet may enter the cage bore at reduced pressure and pass through the body outlet;
(iii) the bonnet being disengagably connected with, and closing, the upper end of the tubular cartridge and the body; and
(iv) the stem being adapted for biasing the flow collar over the main flow ports.

18. The valve of claim 17, further comprising:
at least a pair of diametrically opposed secondary flow ports formed in the side wall of the cage, the secondary flow ports having a smaller diameter than a diameter of the main flow ports and each pair of secondary flow ports being positioned with an axis which is offset by 90° from the axis of one of the pairs of main flow ports and the secondary flow ports being arranged closer to the body outlet than are the main flow ports.

19. The flow trim as defined in claim 5.

20. The tubular cage as defined in claim 5.

21. A method of reducing fracturing of a flow trim component in a valve having a fluid flow path extending therethrough which is to be restricted or closed, the valve being of the type which comprises a hollow valve body assembly with an inlet bore and an outlet bore substantially at right angles and a main bore which is an extension of the outlet bore and which communicates with the inlet bore; a flow trim positioned in the main bore, the flow trim comprising a stationary tubular cage and an external cylindrical flow collar slidable along the side wall of the cage, the cage side wall forming an internal bore aligned with the outlet bore and having a ported portion between its ends formed with one or more flow ports, the external flow collar being located for movement between a closed position wherein the one or more flow ports are fully covered by the external flow collar and an open position wherein each of the flow ports is fully or partially uncovered by the external flow collar, whereby fluid may enter the valve through the inlet bore, pass through the one or more flow ports at reduced pressure and continue through the outlet bore; a bonnet disengagably connected with, and closing, an upper end of the valve body; and a stem for biasing the external sleeve over the flow ports, the method comprising:
forming the tubular cage such that at least the ported portion includes a tubular outer cage member and a tubular inner cage member, the inner cage member and the outer cage member being formed from a tungsten carbide material, being adapted to be concentrically aligned, and having a length to span at least the ported portion; and joining the inner cage member and the outer cage member concentrically together by bonding at an interface formed between the inner cage member and the outer cage member.

22. The method of claim 21, wherein the interface is filled with a ductile bonding material.

23. The method of claim 22, wherein the ductile bonding material is a solder, brazing or cement material.

24. The method of claim 22, wherein the ductile bonding material is a solder or brazing material.

* * * * *